9562X

A. W. Gray.

Corn Sheller.

Patented Mar. 31. 1836.

9562X Mar. 31, 1836

Albert W. Gray · Middletown, Vermont.

Letters Patent

The Schedule referred to in these Letters Patent and making part of the
same containing a description in the words of the said Albert W Gray himself
of his improvement in the corn Sheller.

Figure 1:
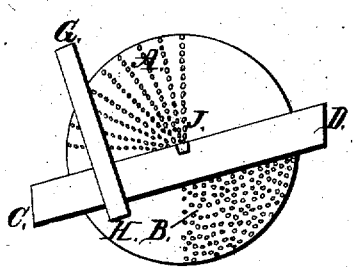
Figure 2:
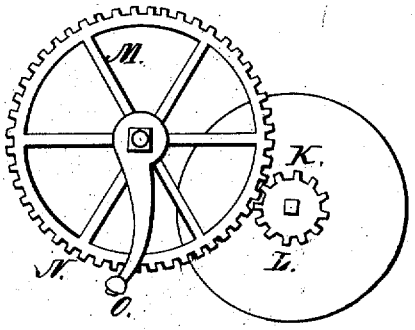

To all to whom these presents shall come: Be it known that I
Albert W. Gray of Middletown in the County of Rutland and State of Ver-
mont have invented a new and useful improvement in the corn sheller
or in the Machine used for shelling Corn. and that the following is a full and
exact description thereof. The machine invented by me the said Albert may
be made either of wood or metal and consist of a rotary circular plate or
solid wheel about fourteen inches in diameter standing perpendicularly.
one or both surfaces of this plate (as shall best suit the maker) is thickly stud-
ded with points made of iron projecting from one sixteenth to three eighths
of an inch. These points are placed either in rows converging towards the centre
(see Plate annexed Fig 1. A) or promiscuously (B) and are generally about one
half inch apart. Through the centre of this plate is placed a horizontal shaft
(I) from four to seven inches long resting upon two bearings. on one end
of this shaft is a pinion two and one half or three inches diameter. This
pinion Fig 2. L.K) is moved by a perpendicular cog wheel fourteen or six-
teen inches in diameter (Fig 2 M N) which is the handle to which the
power is applied Fig 2. O) giving motion to the rotary plate which is princi-
pally instrumental in the operation of shelling. or the power may be applied
immediately to the end of the shaft (Fig 1. J) giving less motion to the plate
and of course shelling the corn more slowly. It consists also of a conductor or
[illegible] like twenty or twenty five inches long made of three pieces and open
on one side. The upper and lower pieces are fast parallel and far enough
apart to admit ears of corn. The side is fastened at one end with a hinge
so as to give the other play or backward and forward motion. This conduc-
tor is placed across the rotary plate (Fig 1. C.D.) with the open side [illegible]

95602X

Mar 31, 1836

Figure 3:
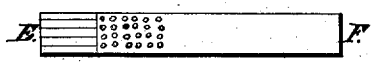

[illegible] points on the surface is inclined and in such a position that ears of corn
placed in the elevated end of the conductor in their passage through it may strike
the surface of the rotary plate just above or just below a line drawn through the
center. The ears of corn thus placed are drawn through the conductor by a draft
made by the points upon the rotary plate when in motion during the process of shel
ling ~~of shelling~~ and the cob passes off at the depressed end of the conductor. a spring
is placed back of the moveable side of the conductor (Fig. 1 G. H.) which serves
to press the ear of corn upon the surface of the rotary plate and by contracting
and enlarging the passage so as to adjust itself to the different sizes of diffe
rent ears of corn as to shell both large and small ears entirely clean the con
ductor must be placed so far from the rotary plate that kernels of corn may come
freely upwards or downwards during the process of shelling. The lower side
of the conductor (Fig 3. E F) is perforated and the lower end cut short
so as to allow the corn when shelled to fall through but the passage is con
tinued to the place where the cob is discharged by means of wires placed parallel
in a wire rack. A screw is placed so as to operate upon the spring which presses
upon the moveable side of the conductor giving a greater or less pressure as
may be required. when the rotary plate has points upon both sides a similar
conductor is placed in similar manner to the foregoing thereby making a double
machine moved by the same power. The rotary plate, conductors and spring
are covered generally with a box 6 by 18 inches square and 14 inches deep
with a small orifice at the bottom to allow the corn to escape. There is also an
orifice at each end of the conductor made through the box at the elevated
end is a hopper and at the lower end the cob is discharged. This box may
be fastened permanently or may be portable placed upon standards. It is usu
ally put in motion by manual power but may be moved by the application of
other power. The foregoing are supposed to be the most convenient propor
tions to be used in the construction of the aforesaid corn sheller but may
be varied without injuring the ^utility of the^ [illegible] so to suit the wishes of purchas[ers]
The machine may also be made to shell faster by multiplying the number
of rotary plates or double rotary plates upon the same shaft and have
one conductor to each plate or two conductors to each double plate. the dou
ble rotary plate is deemed an improvement upon the one commonly or heretofore
used 9562x Mar. 31, 1836 having the points on both sides of the plate instead of one side or surface.
I do not claim as my own invention any part of the said machine separately ta
ken except the said conductor, and the said improvement of said rotary plate or
solid wheel. But what I do claim as my own invention and for which I
ask Letters Patent of the United States in the above described machine
as not being before known or used are, First the said conductor. Second
ly the said improvement of said rotary plate, and thirdly the following
combination of parts - viz. such a rotary plate or solid wheel as the one
described moved in the manner in which said plate is moved and applied
to effect the object of shelling corn and combined with the conductor spring
hinge and screw as before described so contrived as to adjust itself to the dif
ferent sizes of ~~the~~ different ears of corn, and also to keep the ears of corn in
their proper place while passing across the plate giving them a proper drag
and separating the cobs from the corn combined also with the hopper as before des-
cribed so placed as to cause the ears of corn to be received and strike the circular
rotary plate at the proper place.

Witnesses
Merrill Clark
David [illegible]

Albert M Gray

Exd.
[illegible]

1092 words

Patented 31 March 1836

Drawing